United States Patent [19]

Oshiage et al.

[11] Patent Number: 4,729,103

[45] Date of Patent: Mar. 1, 1988

[54] CONTROL DEVICE FOR CONTINUOUSLY VARIABLE TRANSMISSION

[75] Inventors: Katsunori Oshiage; Toshio Matsumura, both of Yokosuka, Japan

[73] Assignee: Nissan Motor Co., Ltd., Yokohama, Japan

[21] Appl. No.: 659,699

[22] Filed: Oct. 11, 1984

[30] Foreign Application Priority Data

Oct. 18, 1983 [JP] Japan .................. 58-193539

[51] Int. Cl.$^4$ .................. B60K 41/12; G06F 15/20
[52] U.S. Cl. .................. 364/424.1; 74/866; 474/12
[58] Field of Search .................. 364/424.1, 161, 164, 364/165, 182; 74/866, 877, 752 D; 474/11, 12, 18, 28, 70

[56] References Cited

U.S. PATENT DOCUMENTS

| | | | |
|---|---|---|---|
| 4,174,641 | 11/1979 | Hillman | 474/12 |
| 4,458,318 | 7/1984 | Smit et al. | 474/18 |
| 4,509,125 | 4/1985 | Fattic et al. | 74/866 |
| 4,515,040 | 5/1985 | Takeuchi et al. | 74/866 |
| 4,536,171 | 8/1985 | Tanaka et al. | 474/18 |

Primary Examiner—Parshotam S. Lall
Attorney, Agent, or Firm—Schwartz, Jeffery, Schwaab, Mack, Blumenthal & Evans

[57] ABSTRACT

A control device for a continuously variable transmission performs a feedback control wherein an integral control gain and a proportional control gain of the feedback control are varied depending upon an operating position assumed by a shift actuator.

5 Claims, 6 Drawing Figures

CONTROL DEVICE FOR CONTINUOUSLY VARIABLE TRANSMISSION

BACKGROUND OF THE INVENTION

The present invention relates to a control device for a continuously variable transmission.

A conventional control device for a continuously variable transmission of the feedback control type is shown in FIG. 1. This control device comprises a means 12 for determining target reduction ratio based on various kinds of signals 10 representative of the operating state of a vehicle, a feedback control means 14 for generating a shift command signal carrying instructions to establish the target reduction ratio determined by the means 12 for determining target reduction ratio, a shift actuator 16 operable on the shift command signal, a continuously variable transmission 18 where a reduction ratio is controlled in response to actuation of the shift actuator 16, and a means 20 for detecting actual reduction ratio in the continuously variable transmission 18. The feedback control means 14 is constructed as follows. A difference between the target reduction ratio generated by the mans 12 for determining target reduction ratio and the actual reduction ratio generated by the means 20 for detecting actual reduction ratio is obtained by an arithmetic unit 14a, this difference is integrated at an integrator 14b and then this integrated value is multiplied with a predetermined integral control gain K1 at a multiplier 14c. On the other hand, this difference obtained at the arithmetic unit 14a is multiplied with a predetermined proportional control gain K2 at a multiplier 14d. The values obtained at the multipliers 14c and 14d are added to each other at an adder 14e and the result is output to the shift actuator 16.

The conventional control device for continuously variable transmission of this type poses a problem as follows, however. Usually, in a continuously variable V-belt transmission, a reduction ratio vs. operating position of a shift actuator characteristic exibits a non-linear relationship as shown in FIG. 2. The fact that a relationship of a reduction ratio with a pulley bias force (i.e., a hydraulic fluid pressure creating a pulley bias force) is non-linear explains the non-linear relationship of the reduction ratio with the operating position of the shift actuator that determines a hydralic fluid pressure creating the pulley bias force. Although it is not impossible to modify the relationship of the reduction ratio with the operating position of the shift actuator to an approximately linear relationship by using a shift control valve, which is operable on the shift actuator and determines the hydraulic fluid pressure creating the pulley bias force, having a non-linear input/output characteristic, the use of such a shift control valve poses problems in quality control in manufacturing the shift control valves of the non-linear characteristic. As mentioned above, since the relationship of the reduction ratio with the operating position of the shift actuator is not linear, a variation (this variation hereinafter being called as "open loop gain") in reduction ratio for a unit amount in operating movement of the shift actuator differs depending upon operating positions assumed by the shift actuator. For example, as shown in FIG. 2, variations (G1, G2) for a unit amount ($\Delta$x) in operating movement of the shift actuator becomes large as the operating position of the shift actuator shifts toward a large reduction ratio (i.e., G1 is not less than G2). Regardless of the fact that the open loop gain differs depending upon the operating positions assumed by the shift actuator in this manner, the conventional control device for continuously variable transmission has used unvariable for the control gains (i.e., the previously mentioned K1, K2) over the whole operating positions assumed by the shift actuator. Therefore, although the control gains are consistent with the open loop gain within a certain range in operating position of the shift actuator, good driving feel cannot be expected within the other range because the response of the feedback control is too slow or hunting takes place frequently.

SUMMARY OF THE INVENTION

An object of the present invention is to provide a control device for a continuously variable transmission wherein over the whole operating range of a shift actuator, a consistent feedback control is carried out.

According to the present invention, a control device for a continuously variable transmission performs a feedback control of a shift actuator wherein a control gain of the feedback control is varied depending upon an operating position assumed by the shift actuator.

DESCRIPTION OF THE EMBODIMENTS

Hereinafter, embodiments according to the present invention are described referring to FIGS. 3 to 6.

First Embodiment

Figure 3:
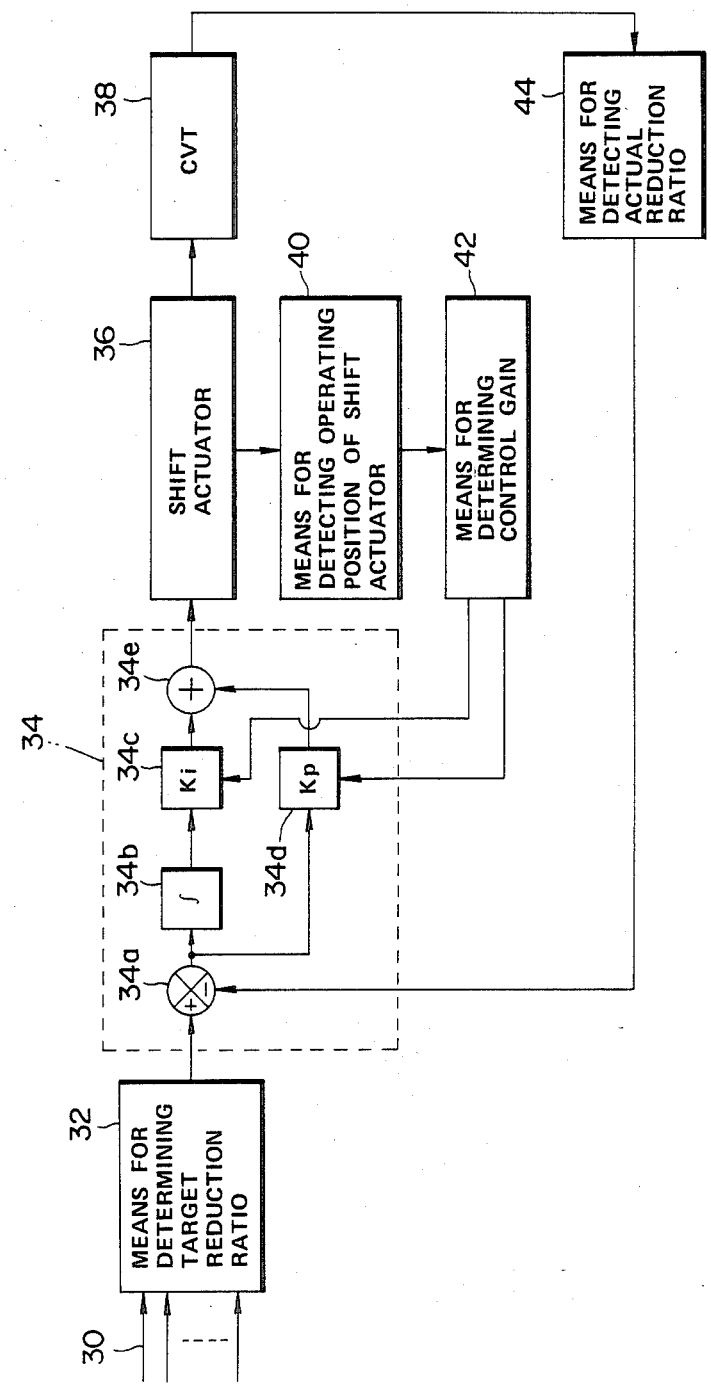
FIG. 3 is a block diagram showing a first embodiment of a control device according to the present invention.

FIG. 3 shows a first embodiment according to the present invention. Various kinds of signals 30 representative of an operating state of a vehicle are fed to a means 32 for determining target reduction ratio where, based on these various kinds of signals 30, a target reduction ratio is determined. The target reduction ratio is determined based on a predetermined shift pattern, which shift pattern represents reduction ratios to be established in a continuously variable transmission which always causes an engine to operate on a minimum fuel consumption curve. The signal indicating the target reduction ratio given by the means 12 for determining target reduction ratio is fed to a feedback control means 34. In a manner described later, the feedback control means 34 feeds to a shift actuator 36 a shift command signal which contains instructions to accomplish the target reduction ratio. The shift actuator 36 operates on the shift command signal, and a reduction ratio in the continuously variable transmission 38 is decided depending upon an operating position of the shift actuator 36. The operating position assumed by the shift actuator 36 is detected by a means 40 for detecting operating position of shift actuator, and the detected signal is fed to a means 42 for determining control gain. In a manner described later, the means 42 for determining control gain decides control gain depending upon the operating position assumed by the shift actuator 36, and feeds the result to the feedback control means 34. An actual reduction ratio in the continuously variable transmission 38 is detected by a means 44 for detecting actual reduction ratio and feeds the detected result to the feedback control means 34.

The feedback control means 34 performs the following operation. In an arithmetic unit 34a, a computation is made to give a difference between the target reduction ratio from the means 32 for determining target reduction ratio and the actual reduction ratio from the means 44 for detecting actual reduction ratio. This difference is integrated by an integrator 34b and the integrated value is amplified with an integrator control gain Ki at a multiplier 34c. (In the manner described later, a value for Ki is determined by the means 42 for determining control gain.) On the other hand, the difference obtained by the arithmetic operation at the arithmetic unit 34a is multipled with a proportional gain Kp at another multiplier 34d. (In the manner described later, a value for Kp is determined by the means 42 for determining control gain). The results obtained by the multipliers 34c and 34d are added to each other at an adder 34e, and the combined result is fed to the shift actuator 36.

Figure 1:
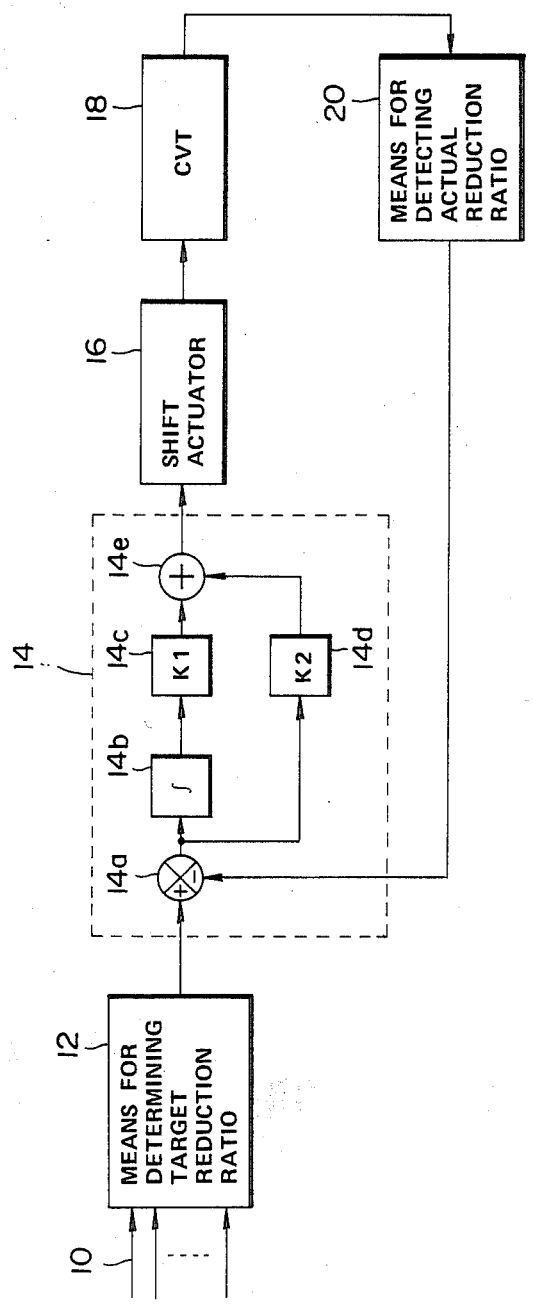
FIG. 1 is a block diagram showing the above discussed conventional control device.
Figure 2:
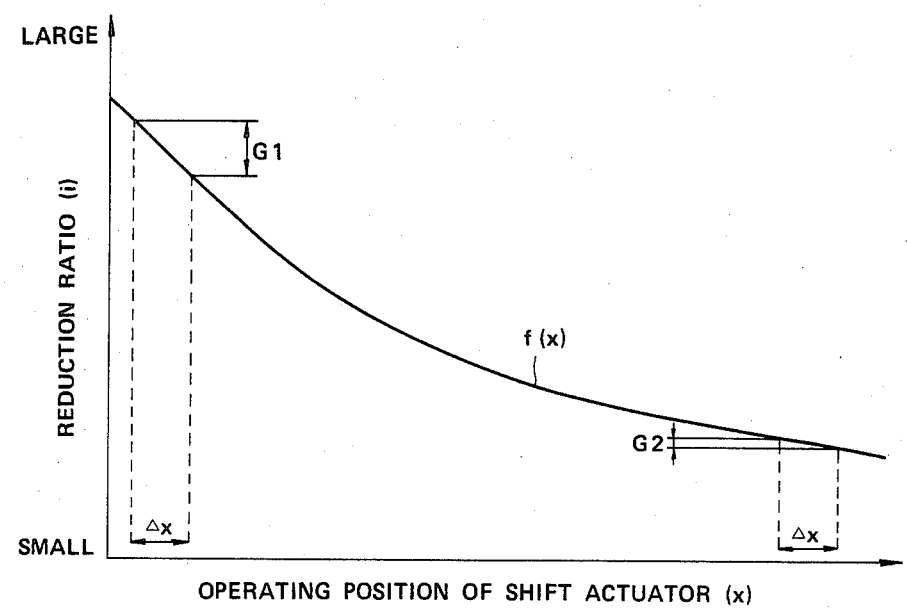
FIG. 2 is a graph showing a relationship of a reduction ratio with an operating position assumed by a shift actuator.

The means 42 for determining control gain decides the integral control gain Ki and the proportional control gain Kp in the following manner. As shown in FIG. 2, the relationship between the operating position of the shift actuator 36 and the reduction ratio exhibits a nonlinear relationship. Let this relationship be expressed by the following equation $$i = f(x)$$

i ... reduction ratio
x ... operating position of shift actuator.

Since it is a variation in reduction ratio for a unit amount in movement of the shift actuator 36, an open loop gain is produced which is a first derivative of the function f(x) with respect to x. That is,
ti $Go = f'(x)$ Go ... open loop gain and f'(x) is the derivative of f with respect to x. For optimum feedback control performance over the whole range of the operating position of the shift actuator 36, a control gain Gc with which the feedback control characteristic is modified should be inversely proportional to the open loop gain Go. This may be expressed as $$Gc = L/Go = L/f'(x),$$

(where L is a constant). If this equation is used, the integral control gain Ki and the proportional control gain Kp may be expressed as $$Kp = L1/f'(x)$$

$$Ki = L2/f'(x),$$

where L1 and L2 are constant values. Within the means 42 for determining control gain, arithmetic operations as expressed by the above equations are performed to give the integral control gain Ki and the proportional control gain Kp. The integral control gain Ki and the proportional control gain Kp thus given are fed to the multipliers 34c and 34d of the feedback control means 34, respectively. In these multipliers, the above mentioned arithmetic operations are performed using these control gains. In this manner, where the open loop gain is large, each of the control gains for the feedback control becomes small, while where the open loop gain is small, it becomes large, thus providing a consistent feedback control over the whole operating range.

Figure 5:
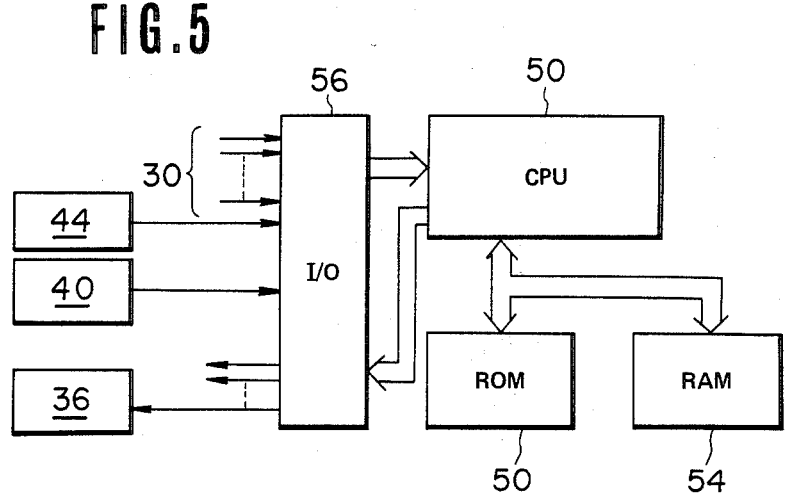
FIG. 5 is a block diagram showing a practical version of the first embodiment shown in FIG. 3.
Figure 6:
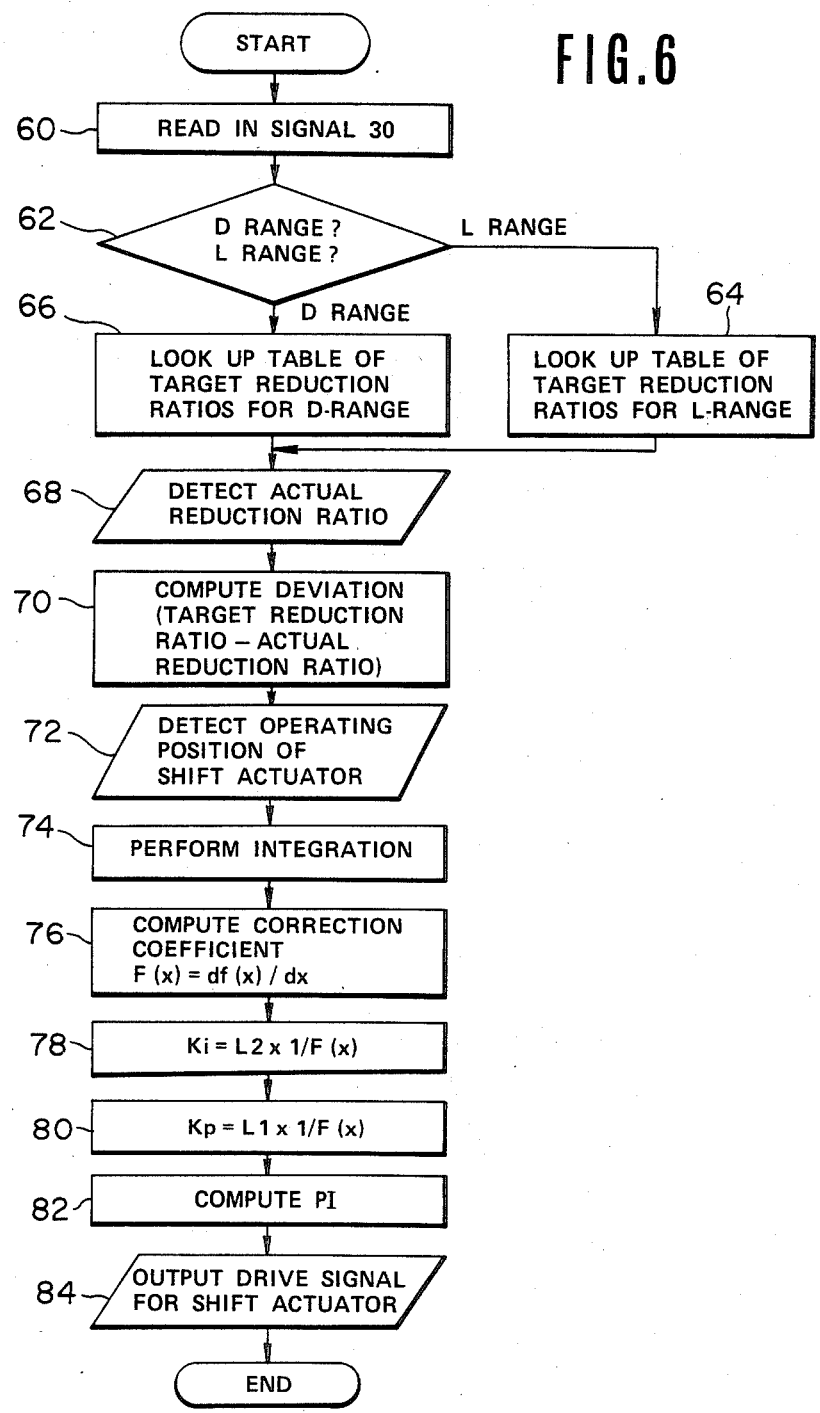
FIG. 6 is a flowchart.

Referring to FIGS. 5 and 6, a practical version, using a microcomputer, of the first embodiment shown in FIG. 3 is described. As shown in FIG. 5, the microcomputer comprises CPU 50, ROM 52, RAM 54 and I/O 56 in the usual manner. The ROM 50 stores a control program as shown in FIG. 6.

Referring to FIG. 6, various kinds of signals 30 representative of an operating state of a vehicle are read in (in step 60), a decision is made whether a manual selector lever (not shown) is placed in D-range position or L-range position (in step 62). If L-range is selected, the control proceeds to a step 64 where a table of target reduction ratios for L-range is looked up to determine a target reduction ratio for the operating state of the vehicle, and then the control proceeds to a step 68. If the D-range is selected in step 62, a table of target reduction ratios for D-range is looked up to determine a target reduction ratio for the operating state of the vehicle in step 66 and then the control proceeds to the step 68. In the step 68, an actual reduction ratio is read in from a means 44 for detecting actual reduction ratio. In the subsequent step 70, the target reduction ratio is subtracted by the actual reduction ratio to determine a deviation. Then, the control proceeds to a step 72 where an operating position of a shift actuator 36 is read in from a means 40 for detecting operating position of shift actuator. In the subsequent step 74, the deviation obtained in step 70 is integrated. In step 76, a correction coeffecient F(x) is given by differentiating f(x), where x is the operating position of the shift actuator obtained in step 70. The function f(x) used is the same as the one shown in FIG. 2. After computing the correction coeffecient F(x) for the operating position of the shift actuator, an integral control gain Ki is given by multiplying an inverse of F(x) with a constant L2 in step 78 and then a proportional control gain Kp is given by multiplying an inverse of F(x) with a constant L1 in step 80. Then, an output drive signal is computed on the integral and proportional factors in step 82. The drive signal is output to the shift actuator 36 in step 84. In the case the function f(x) is not simple, it is desired to use a table look-up.

Second Embodiment

Figure 4:
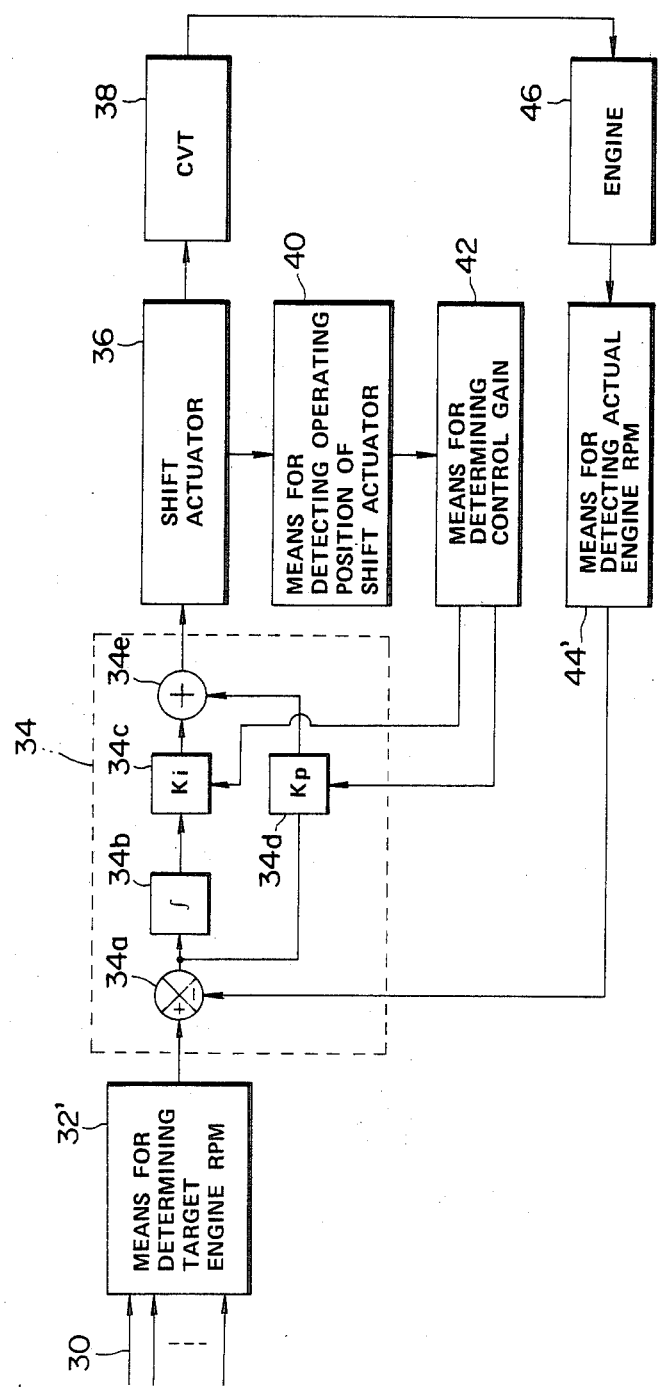
FIG. 4 is a block diagram showing a second embodiment according to the present invention.

FIG. 4 shows a second embodiment according to the present invention. In this embodiment, the present invention has been embodied in a feedback control device where after a target engine revolution speed is determined by a means 32' for determining target engine revolution speed and an actual revolution speed of an engine 46 is detected by a means 44' for detecting actual engine revolution speed, they are processed under a feedback control. This second embodiment is different from the first embodiment only in that what is controlled is an engine revolution speed, and the remaining portion is substantially the same as the first embodiment in function and operation.

Although, in the above described embodiments, a predetermined function $i = f(x)$ is used to express the relationship of the reduction ratio (i) with the operating position (x) assumed by the shift actuator, and then the integral control gain and the proportional control gain are given by arithmetic operation of differentiated value of this function, a microcomputer may be used such that an optimum integral control gain and an optimum proportional gain for each of the operating positions assumed by the shift actuator are stored in terms of a table and these values are read out for the detected operating position of the shift actuator.

As described above, since, according to the present invention, a control gain of a feedback control is varied depending upon each of operating positions assumed by a shift actuator, a consistent feedback control device is provided which is free from hunting or response delay.

What is claimed:

1. In a control device for a continuously variable transmission having a shift actuator which causes a reduction ratio of the transmission to vary as a predetermined non-linear function of an operating position of the shift actuator, the control device having an open loop gain which is defined as the first derivative of said predetermined non-linear function with respect to operating position of said shift actuator and effecting a feedback control of the shift actuator with a variable control gain in a manner such that a difference between an actual value variable within the reduction ratio and a target value is decreased toward zero,
  means for detecting the operating position of said shift actuator and generating an operating position indicative signal; and
  means responsive to said operating position indicative signal for varying said variable control gain in relation to the predetermined non-linear function of the operating position of the shift actuator as indicated by said operating position indicative signal, so that said control gain is inversely proportional to said open loop gain,
  so that the feedback control is effected with a control gain that is variable in response to the predetermined non-linear function of the detected operating position of the shift actuator.

2. In a control device as claimed in claim 1, wherein the target value and the actual value are a target reduction ratio and an actual reduction ratio of the continuously variable transmission, respectively.

3. In a control device as claimed in claim 1, wherein the actual value and the target value are an actual engine revolution speed of the engine and a target engine revolution speed, respectively.

4. In a method of controlling a continuously variable transmission having a shift actuator which causes a reduction ratio of the transmission to vary as a predetermined non-linear function of an operating position of the shift actuator, the control device having an open loop gain which is defined as the first derivative of said predetermined non-linear function with respect to operating position of said shift actuator and effecting a feedback control of the shift actuator with a variable control gain in a manner such that a difference between an actual value variable within the reduction ratio and a target value is decreased toward zero,
  detecting the operating position assumed by the shift actuator and generating an operating position indicative signal; and
  varying responsive to said operating position indicative signal said variable control gain in relation to the predetermined non-linear function at the detected operating position of the shift actuator, so that said variable control gain is inversely proportional to said open loop gain,
  whereby the feedback control is effected with the variable control gain that varies in response to the predetermined non-linear function at the operating position detected of the shift actuator.

5. In a method of controlling a continuously variable transmission having a shift actuator which causes a reduction ratio of the transmission to vary as a predetermined non-linear function of operating position of the shift actuator, the control device having an open loop gain which is defined as the first derivative of said predetermined non-linear function with respect to operating position of said shift actuator and effecting a feedback control of the shift actuator with a variable control gain in a manner such that a difference between an actual value variable within the reduction ratio and a target value is decreased toward zero,
  detecting the operating position assumed by the shift actuator and generating an operating position indicative signal;
  calculating the first derivative of the predetermined non-linear function with respect to the operating position of the shift actuator to provide said open loop gain at the operating position of the shift actuator indicated by said operating position indicative signal, and
  setting the variable control gain of the feedback control equal to a value inversely proportional to the first calculated derivative so that the variable control gain is inversely proportional to said open loop gain,
  so that the feedback control is effected with a variable control gain that varies in response to the predetermined non-linear function of the operating position of the shift actuator.

* * * * *